United States Patent
Chao et al.

(10) Patent No.: US 8,339,065 B2
(45) Date of Patent: Dec. 25, 2012

(54) DRIVING CIRCUIT AND ILLUMINATION APPARATUS USING THE SAME

(75) Inventors: Yang-Jui Chao, Taipei Hsien (TW); Chieh-Lun Cheng, Taipei Hsien (TW); Lin-Hao Wei, Shenzhen (CN); Ji-Bao Fu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 198 days.

(21) Appl. No.: 12/871,934

(22) Filed: Aug. 31, 2010

(65) Prior Publication Data
US 2011/0304277 A1 Dec. 15, 2011

(30) Foreign Application Priority Data
Jun. 10, 2010 (CN) .......................... 2010 1 0197727

(51) Int. Cl.
*H05B 37/02* (2006.01)
(52) U.S. Cl. .................................... 315/291; 315/209 R

(58) Field of Classification Search .............. 315/209 R, 315/86, 291, 299; 307/43, 64, 80, 85
See application file for complete search history.

(56) References Cited

U.S. PATENT DOCUMENTS

| | | | | |
|---|---|---|---|---|
| 5,332,993 | A * | 7/1994 | Ninomiya ..................... | 340/635 |
| 2006/0232133 | A1* | 10/2006 | Cha ................................ | 307/23 |
| 2009/0154148 | A1* | 6/2009 | Meyer et al. .................. | 362/157 |
| 2012/0068601 | A1* | 3/2012 | Rohner et al. .................. | 315/86 |

FOREIGN PATENT DOCUMENTS

CN 1848593 A 10/2006

* cited by examiner

*Primary Examiner* — Thuy Vinh Tran
(74) *Attorney, Agent, or Firm* — Altis Law Group, Inc.

(57) ABSTRACT

An illumination apparatus including an LED comprises a battery holder, an AC/DC adapter interface, an LED unit, and a switch unit. The battery holder is configured to receive a battery. The AC/DC adapter interface is connected to an AC/DC adapter. When the AC/DC adapter is not connected to the AC/DC adapter interface, the switch unit is turned on to allow the driving unit to receive power from the battery. When the AC/DC adapter is connected to the AC/DC adapter interface, the switch unit is turned off to allow the driving unit to receive power from the AC/DC adapter. A driving circuit applied in an illumination apparatus is also provided.

18 Claims, 2 Drawing Sheets

DRIVING CIRCUIT AND ILLUMINATION APPARATUS USING THE SAME

BACKGROUND

1. Technical Field

The present disclosure relates to illumination technology and, particularly, to an illumination apparatus and a driving circuit applied therein.

2. Description of the Related Art

Illumination apparatuses, such as light-emitting diodes (LEDs), can be powered by batteries or AC/DC adapters. However, if batteries are not removed from the device before selecting AC/DC supply, damage to the illumination apparatus may result.

Therefore, what is needed is an illumination apparatus to overcome the limitations described.

BRIEF DESCRIPTION OF THE DRAWINGS

The components in the drawings are not necessarily drawn to scale, the emphasis instead being placed upon clearly illustrating the principles of an illumination apparatus. Moreover, in the drawings, like reference numerals designate corresponding parts throughout the several views.

DETAILED DESCRIPTION

Figure 1:
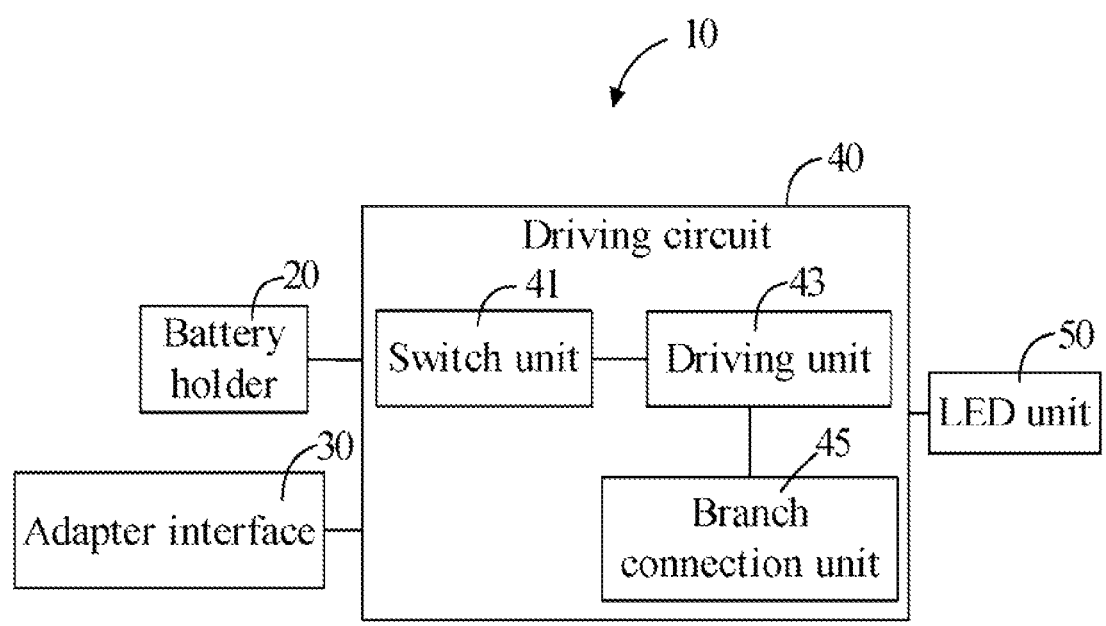
FIG. 1 is a block diagram of an illumination apparatus in accordance with an exemplary embodiment.

Referring to FIG. 1, an illumination apparatus 10 includes a battery holder 20, an adapter interface 30, a driving circuit 40, and an LED unit 50. The battery holder 20 is configured to receive a battery (not shown). The apparatus 10 can receive power from an AC/DC adapter (not shown) via the adapter interface 30. In the embodiment, the adapter interface 30 is a USB interface. When the AC/DC adapter is connected to the apparatus 10 through the USB interface, the apparatus 10 automatically selects the AC/DC adapter as a power source to power the apparatus 10.

The driving circuit 40 includes a switch unit 41, a driving unit 43, and a branch connection unit 45. When the AC/DC adapter is not connected to the apparatus 10, the switch unit 41 is turned on to allow the driving unit 43 to receive power from the battery. When the AC/DC adapter is connected to the apparatus 10, the switch unit 41 is turned off to allow the driving unit 43 to receive power from the AC/DC adapter. When the AC/DC adapter is connected to the apparatus 10, the branch connection unit 45 is connected to the LED unit 50 in parallel to ensure the driving current to the LED unit 50 is stable and uninterrupted.

Figure 2:
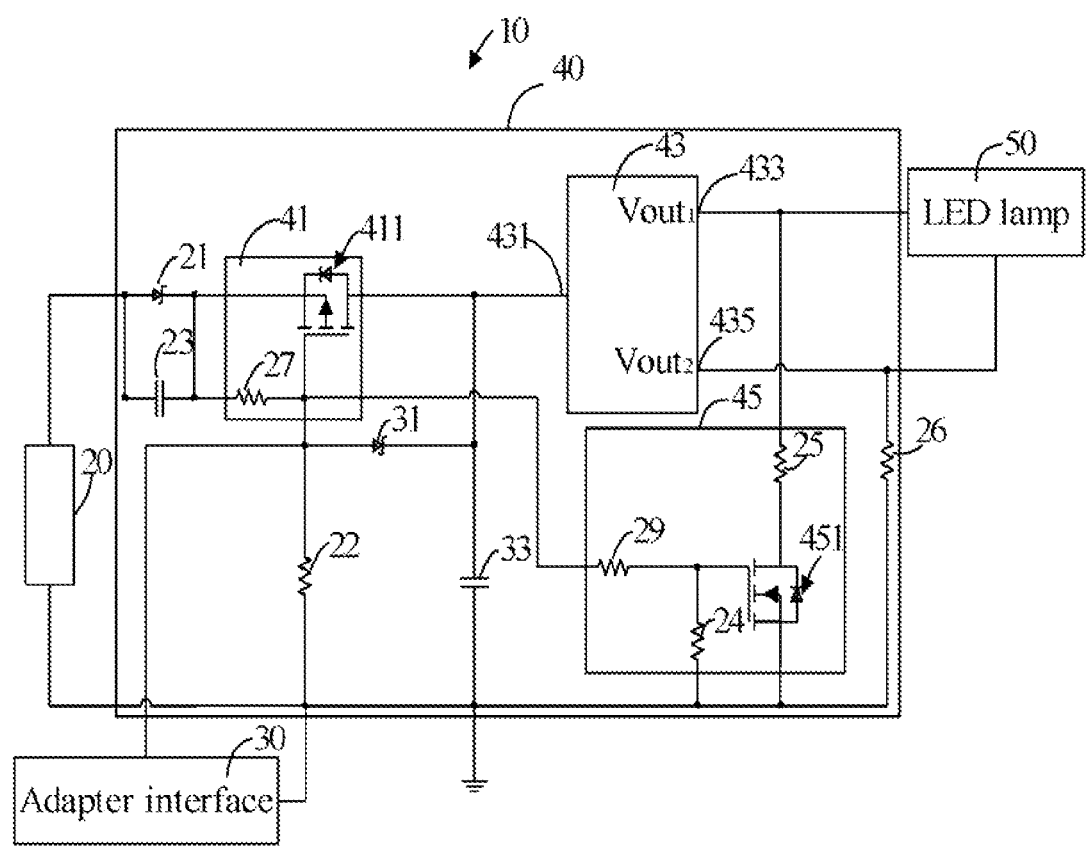
FIG. 2 is a circuit diagram of the illumination apparatus of FIG. 1.

Referring to FIG. 2, the switch unit 41 includes a transistor 411 and a first resistor 27 connected to the transistor 411. In this embodiment, the switch transistor 411 is a P-channel metal-oxide-semiconductor (PMOS) field-effect transistor. The source of the transistor 411 is connected to an anode of the battery holder 20, the drain of the transistor 411 is connected to the driving unit 43, and the gate of the transistor 411 is connected to the adapter interface 30 and also grounded via a second resistor 22. A first diode 21 is connected between the battery holder 20 and the source of the PMOS transistor 411, and a capacitor 23 is connected to the first diode 21 in parallel. The first diode 21 and the capacitor 23 enable the battery to output stable voltage.

The driving unit 43 includes an input port 431, a first voltage output port 433, and a second voltage output port 435. The battery holder 20 is connected to the input port 431 via the switch unit 41, and the AC/DC adapter interface 30 is connected to the input port 431 via a second diode 31. The anode of the second diode 31 is connected to the AC/DC adapter interface 30 via the second resistor 22, and the cathode of the second diode 31 is connected to the input port 431 and also grounded via a second capacitor 33, which enables the AC/DC adapter to output stable voltage. The LED unit 50 is connected between the first voltage output port 433 and the second voltage output port 435.

The branch connection unit 45 includes a transistor 451. In the embodiment, the transistor 451 is an N-channel metal-oxide-semiconductor field-effect transistor. The gate of the transistor 451 is connected to the gate of the PMOS transistor 411 via a third resistor 29, the drain of the transistor 451 is connected to the first voltage output port 433 via a fourth resistor 25, and the source of the NMOS transistor 451 is grounded. A fifth resistor 24 is connected between the gate and the source of the NMOS transistor 451.

Accordingly, when connected to the illumination apparatus 10, the AC/DC adapter applies a voltage to the transistor 411, which is accordingly turned off to prevent battery supply to the driving unit 43. Simultaneously, the AC/DC adapter also applies a voltage to the transistor 451, which is accordingly turned on. Accordingly, the AC/DC adapter can provide stable current to the LED unit 50.

It is understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An illumination apparatus comprising:
   a battery holder configured to receive a battery;
   an AC/DC adapter interface configured to be connected to an AC/DC adapter;
   an LED unit;
   a switch unit; and
   a driving unit for driving the LED unit;
   a branch connection unit for connecting to the LED unit in parallel to ensure the current of the LED unit is stable when the AC/DC adapter is connected to the illumination apparatus;
   wherein when the AC/DC adapter is not connected to the AC/DC adapter interface, the switch unit is turned on to allow the driving unit to receive power from the battery; when the AC/DC adapter is connected to the AC/DC adapter interface, the switch unit is turned off to allow the driving unit to receive power from the AC/DC adapter.

2. The illumination apparatus as claimed in claim 1, wherein the switching unit comprises a transistor and a first resistor, a first terminal of the transistor is connected to an anode of the battery holder, a second terminal of the transistor is connected to the driving unit, and a third terminal of the transistor is configured for receiving power from the AC/DC adapter via a resistor.

3. The illumination apparatus as claimed in claim 2, further comprising a first diode and a capacitor connected with the first diode in parallel, wherein the first terminal of the switch transistor is connected to an anode of the battery holder through the first diode and the capacitor.

4. The illumination apparatus as claimed in claim 1, wherein the switch unit includes a P-channel metal-oxide-semiconductor (PMOS) field-effect transistor, the source of which is connected to an anode of the battery holder, the drain of which is connected to the driving unit, and the gate of which is configured for receiving power from the AC/DC adapter via a resistor.

5. The illumination apparatus as claimed in claim 4, further comprising a first voltage regulator diode and a capacitor connected with the first voltage regulator diode in parallel, wherein the source of the PMOS transistor is connected to an anode of the battery holder through the first diode and the capacitor.

6. The illumination apparatus as claimed in claim 1, wherein the branch connection unit includes a transistor and a fourth resistor connected to the transistor, wherein the transistor is connected to the AC/DC adapter.

7. The illumination apparatus as claimed in claim 6, wherein the transistor is an N-channel metal-oxide-semiconductor (NMOS) field-effect transistor, the gate of the transistor is connected to the switching unit via a third resistor, the drain of the transistor is connected to the driving unit via the fourth resistor, and the source of the transistor is grounded; a fifth resistor is connected between the gate and the source of the transistor.

8. The illumination apparatus as claimed in claim 6, wherein the first terminal of the transistor is connected to the switching unit via a third resistor, the second terminal of the transistor is connected to the driving unit via a fourth resistor, and the third terminal of the transistor is grounded; wherein a fifth resistor is connected between the first terminal and the third terminal of the transistor.

9. The illumination apparatus as claimed in claim 1, wherein the driving unit includes an input port, a first voltage output port, and a second voltage output port; the battery holder is connected to the input port via the switch unit, and the AC/DC adapter interface is connected to the input port via a second diode; the LED unit is connected between the first voltage output port and the second voltage output port.

10. A driving circuit applied in an illumination apparatus, the illumination apparatus comprising an LED unit, a battery holder, and an AC/DC adapter interface, the battery holder configured to receive a battery, the AC/DC adapter interface configured to be connected to an AC/DC adapter, the driving circuit comprising:
   a switch unit; and
   a driving unit for driving the LED unit;
   a branch connection unit connected to the LED unit in parallel to ensure the driving current of the LED unit is stable, when the AC/DC adapter is connected to the illumination apparatus;
   wherein when the AC/DC adapter is not connected to the AC/DC adapter interface, the switch unit is turned on to allow the driving unit to receive power from the battery; and when the AC/DC adapter is connected to the AC/DC adapter interface, the switch unit is turned off to allow the driving unit to receive power from the AC/DC adapter.

11. The driving circuit as claimed in claim 10, wherein the switching unit comprises a transistor and a first resistor, a first terminal of the transistor is connected to an anode of the battery holder, a second terminal of the transistor is connected to the driving unit, and a third terminal of the transistor is configured for receiving power from the AC/DC adapter via a second resistor.

12. The driving circuit as claimed in claim 11, further comprising a first diode and a capacitor connected with the first diode in parallel, the first terminal of the switch transistor connected to an anode of the battery holder through both the first diode and the capacitor.

13. The driving circuit as claimed in claim 10, wherein the switch unit includes a P-channel metal-oxide-semiconductor (PMOS) field-effect transistor, wherein the source of the transistor is connected to an anode of the battery holder, the drain of the transistor is connected to the driving unit, and the gate of the transistor is configured for receiving power from the AC/DC adapter via a second resistor.

14. The driving circuit as claimed in claim 13 further comprising a first voltage regulator diode and a capacitor connected with the first voltage regulator diode in parallel, wherein the source of the PMOS transistor is connected to an anode of the battery holder through both the first diode and the capacitor.

15. The driving circuit as claimed in claim 10, wherein the branch connection unit includes a transistor and a fourth resistor connected to the transistor, the transistor connected to the AC/DC adapter.

16. The driving circuit as claimed in claim 15, wherein the transistor is an N-channel metal-oxide-semiconductor (NMOS) field-effect transistor, the gate of the which is connected to the switching unit via a third resistor, the drain of the which is connected to the driving unit via the fourth resistor, and the source of the which is grounded; wherein a fifth resistor is connected between the gate and the source of the transistor.

17. The driving circuit as claimed in claim 15, wherein the first terminal of the transistor is connected to the switching unit via a third resistor, the second terminal of the transistor is connected to the driving unit via the fourth resistor, and the third terminal of the transistor is grounded; wherein a fifth resistor is connected between the first terminal and the third terminal of the transistor.

18. The driving circuit as claimed in claim 10, wherein the driving unit includes an input port, a first voltage output port, and a second voltage output port; wherein the battery holder is connected to the input port via the switch unit, and the AC/DC adapter interface is connected to the input port via a second diode; and the LED unit is connected between the first voltage output port and the second voltage output port.

* * * * *